S. GLENN.
TRUCK AND TRACTOR ATTACHMENT FOR AUTOMOBILES.
APPLICATION FILED JULY 21, 1919.
1,375,000.
Patented Apr. 19, 1921.
2 SHEETS—SHEET 1.
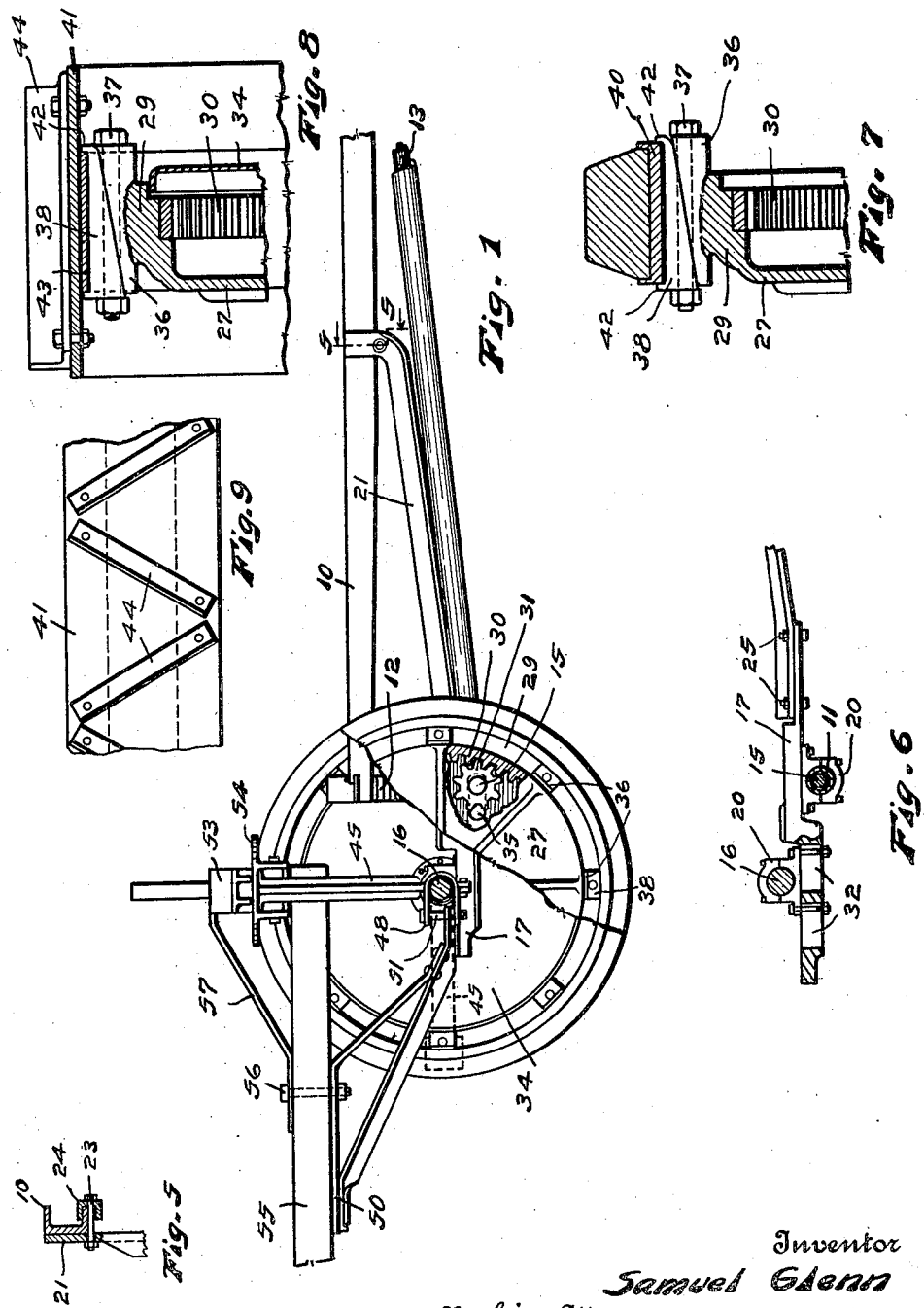
Inventor
Samuel Glenn
By his Attorney
Horace Barnes S. GLENN.
TRUCK AND TRACTOR ATTACHMENT FOR AUTOMOBILES.
APPLICATION FILED JULY 21, 1919.
1,375,000.
Patented Apr. 19, 1921.
2 SHEETS—SHEET 2.
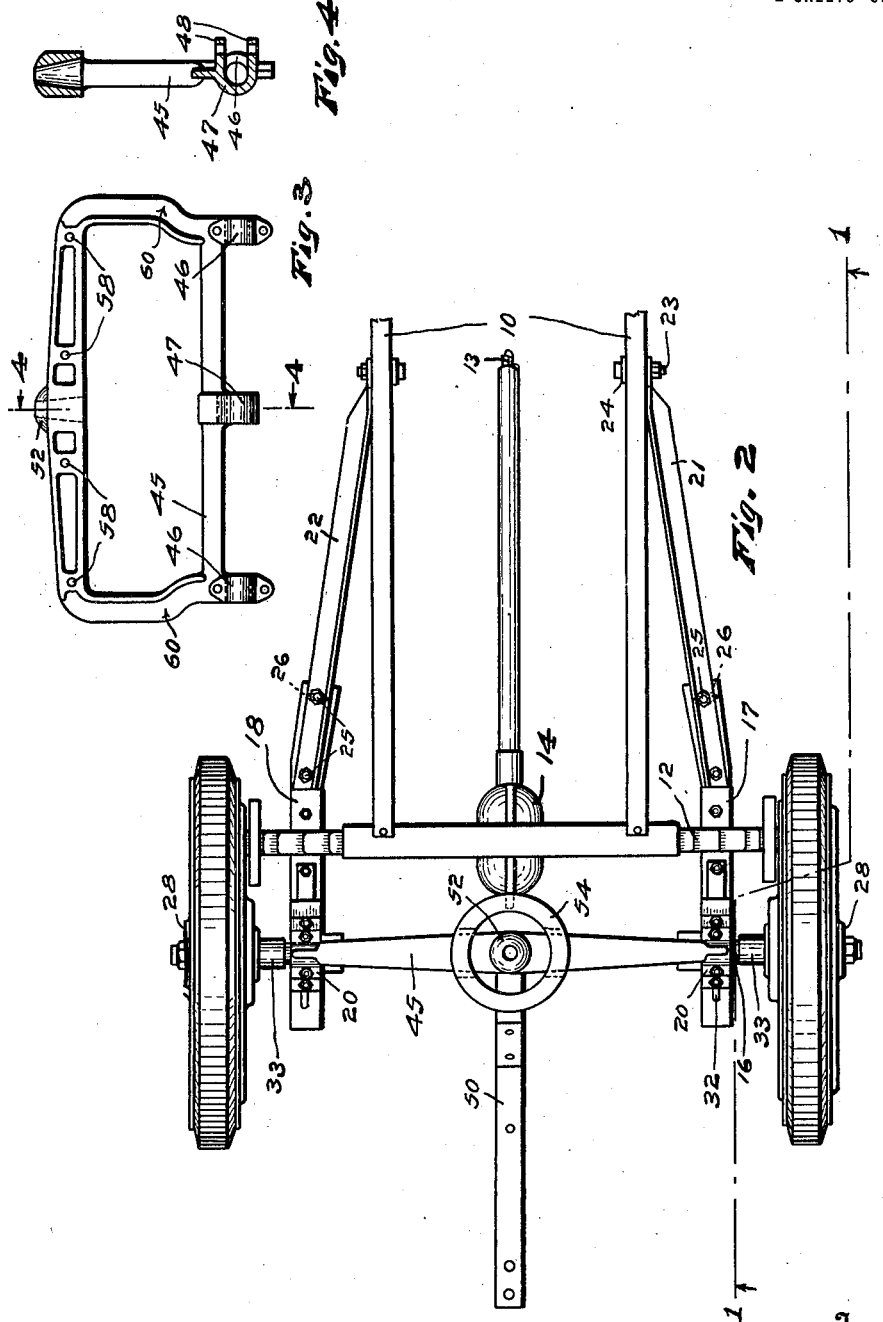
Inventor
Samuel Glenn
By his Attorney
Horace Barnes

UNITED STATES PATENT OFFICE.

SAMUEL GLENN, OF SEATTLE, WASHINGTON.

TRUCK AND TRACTOR ATTACHMENT FOR AUTOMOBILES.

1,375,000.   Specification of Letters Patent.   Patented Apr. 19, 1921.

Application filed July 21, 1919. Serial No. 312,440.

*To all whom it may concern:*

Be it known that I, SAMUEL GLENN, a citizen of the United States, residing at Seattle, in the county of King and State of Washington, have invented a new and useful Improvement in Truck and Tractor Attachments for Automobiles, of which the following is a specification.

This invention relates to improvements in truck and tractor attachments for automobiles, and the object of this improvement is to provide a device that may be quickly and easily attached to or detached from the chassis of a motor car to convert such motor car into a truck or tractor.

A further object is to provide an attachment of this nature that may be readily converted from truck to tractor form and vice versa, the tractor rims and the truck rims being interchangeable on the wheels and the other parts of the devices being arranged to be changed slightly to adapt the device to be used for drawing a load, as a plow, or for receiving and supporting the front end of a trailer vehicle, as a wagon.

A still further object is to provide a device of this nature that is equipped with a powerful and direct driving gear and one wherein the gear ratio may be changed to suit the work that is being done.

The invention consists in the novel construction, adaptation and combination of parts of a truck and tractor attachment for automobiles as will be more clearly hereinafter described and claimed.

In the accompanying drawings Figure 1 is a view partly in cross section substantially on a broken line 1, 1 of Fig. 2 of this attachment as it may appear when it is installed on an automobile and has a trailer vehicle connected therewith; Fig. 2 is a plan view of the same, with the parts of the trailer vehicle omitted; Fig. 3 is a view in elevation of a yoke that forms a part of the invention; Fig. 4 is a view in cross section on broken line 4, 4 of Fig. 3; Fig. 5 is a view in cross section on broken line 5, 5 of Fig. 1; Fig. 6 is a detached view in elevation showing the connection between the driven axle and the axle of the attachment; Fig. 7 is a fragmentary sectional view showing the mechanism for attaching a truck rim to the wheel; Fig. 8 is a fragmental sectional view showing the same mechanism used for attaching a tractor rim to the wheel, and Fig. 9 is a plan view of a fragment of the tractor rim.

Like reference numerals designate like parts throughout the several views.

Referring to the drawings, the numeral 10 designates the rear end of an automobile frame which is supported above an axle housing 11 by springs 12 and which is provided with the usual drive shaft 13 and differential 14 by which axles 15 are driven, all of the above described parts being of any well known standard form of construction.

The attachment comprises an auxiliary axle 16 that is disposed to the rear of the axles of the car and is connected with the axle housing 11 by connecting links 17 and 18 disposed near the ends of the axles. The axle 16 and axle housing 11 are each secured to the connecting links 17 and 18 by brackets 20, see Fig. 6.

The forward ends of the connecting links 17 are flattened as shown in Figs. 1 and 6 and are adapted to have the rear ends of brace members 21 and 22 secured thereto. The brace members 21 and 22 extend forwardly and inwardly as shown in Figs. 1 and 2 and are connected with the side members of the automobile frame 10 by bolts 23 that extend through the brace members 21 and 22 just below the frame members 10 and are provided on their inner ends with U shaped clips 24 that hook over the lower flanges of the frame members 10, as more clearly shown in Fig. 5, thereby serving to form a strong and solid but not a rigid connection. The rear ends of the brace members 21 and 22 are preferably each secured to the links 17 and 18 by two bolts 25, one of which passes through a slotted hole 26 so that the distance between the outer ends of the brace members may be adjusted, to fit frames of different widths.

The ends of the axle 16 have wheels journaled thereon, the wheels preferably being formed of cast metal webs 27 that have hub portions 28 and are provided with fellies 29 within which are secured, internally toothed ring gears 30.

The ring gears 30 are arranged to mesh with gear pinions 31 that are secured on the ends of the differential axles 15 of the automobile. The holes in the connecting links 17 and 18 by which the brackets 20 are secured to such links are preferably slotted as shown at 32 in Figs. 2 and 6 so that the distance between the driven axles 15 and the auxiliary axle 16 may be varied to permit the use of pinions 31 of various size for the purpose of changing the gear ratio. In practice it has been found satisfactory to provide three different sizes of pinions 31 although it is obvious that any number of such pinions of different size may be used.

The hub portions of the wheels are made unusually long on the inner side as indicated at 33, so that such wheels may be slipped outwardly on the axle 16 far enough to permit the pinions 31 to be moved into mesh with the internal gears 30 when the device is assembled. The inner side of the wheel is closed by a circular cover member 34 that may be slotted as at 35 where the differential axles 15 pass through it to admit of the necessary adjustment when gear pinions 31 of different sizes are used.

The peripheral portions or fellies 29 of the wheels are provided at frequent intervals with inclined lugs 36 that are grooved for the reception of bolts 37 and are adapted to coöperate with other inclined separable lugs 38 in securing a truck rim 40 or a tractor rim 41 onto the wheels. The lugs 38 may have shallow flanges 42 on each side thereof to engage with and grip the edges of the truck rim or the edges of an annular band 43 on the inside of the tractor rim. The direction of inclination of the lugs 36 and 38 is preferably such that the truck and tractor tires may be put on and taken off from the outside of the wheel.

The tractor wheels may be provided with peripheral lugs 44 of any desired shape and arrangement, as shown in Fig. 9.

45 is a yoke having bearings 46 at each end thereof that fit over the auxiliary axle 16 just inside of the connecting links 17 and 18 and having a half bearing 47 in the middle thereof that fits over the axle 16 and terminates in a clip 48 that projects rearwardly therefrom and is adapted to have a draw bracket 50 secured thereto by means of a bolt or pin 51.

The upper portion of the yoke 45 is provided with a centrally located integral, rounded, knob or boss 52 having a flaring hole projecting downwardly therethrough, such boss being adapted to serve as a pivotal bearing for a bolster 53 that may be placed thereon as shown in Fig. 1 and being adapted to have a king bolt or pin inserted through the flaring hole therein.

The upper side of the yoke is preferably provided with a support or fifth wheel 54 as shown in Figs. 1 and 2 that prevents the bolster 53 from rocking.

The bracket 50 extends rearwardly and upwardly from the clip 48 and is arranged to have the reach or coupling pole 55 of a trailer vehicle secured thereto as by a bolt 56 which bolt 56 also serves to hold one end of an angular brace 57 that extends forwardly to the bolster 53 and is pivotally secured on the king pin that secures such bolster to the yoke 45.

In the manner just described a wagon may be conveniently used as a trailer vehicle by dispensing with the front portion of the running gear of such wagon, setting the front bolster on the yoke 45, and securing the wagon reach or coupling pole to the bracket 50.

When the device is used as a tractor for drawing a load, as a plow or other piece of farm machinery, the bracket 50 is removed and the yoke 45 is turned rearwardly and downwardly into a substantially horizontal position as shown by dotted lines in Fig. 1 so that the load may be secured to the yoke, holes 58 being provided in the upper portion of the yoke to receive the securing means.

When the yoke is turned rearwardly into the horizontal position the side rib portions indicated at 60 in Fig. 3 will rest upon and be supported by the rearwardly projecting ends of the link members 17 and 18, thus keeping the yoke 45 clear of the ground at all times.

The attachment may be quickly and easily installed on an automobile and after it is installed may be readily changed from a truck to a tractor and vice versa.

It is obvious that changes in the form of construction and arrangement of parts of this attachment may be resorted to within the scope of the following claims.

What I claim is:

1. The combination with a motor vehicle attachment which includes a transverse auxiliary axle having wheels on each end and provided adjacent each end with a forwardly projecting bar that is arranged to be connected with the frame of a motor vehicle, of a yoke arranged to span the central portion of said auxiliary axle and pivotally connected therewith at each end whereby said yoke may occupy a substantially vertical position for supporting a load or a substantially horizontal position for pulling a load.

2. The combination with an automobile chassis having the rear wheels removed, of pinions secured on the ends of the differential axles of said automobile, a bar secured to each side of the frame of said automobile and extending rearwardly therefrom in divergent relation thereto, the rear axle housing of said automobile being secured to said bars, an auxiliary axle secured to the rear ends of said bars, wheels on said auxiliary axle, internal gears in said wheels arranged to mesh with said pinions, a yoke carried on said auxiliary axle and arranged to stand in an upright position and a draw bracket secured to said yoke and arranged to extend rearwardly and upwardly from said auxiliary axle.

3. The combination with an automobile chassis having the rear wheels removed, of an auxiliary axle having wheels provided thereon and arranged to be disposed in rear of said chassis, means connected with said auxiliary axle and said chassis for supporting the rear end of said chassis on said auxiliary axle, means for driving said wheels by the power furnished by the automobile, a yoke secured to said auxiliary axle and arranged to be turned from a horizontal position where it is adapted to draw a load into a vertical position where it is adapted to support a load, means on the top of said yoke for receiving the bolster of a trailer vehicle and a bracket detachably secured to said yoke and arranged to be connected with the reach of a trailer vehicle.

4. In an attachment of the class described the combination with an auxiliary axle that is provided with wheels and is arranged to carry the rear end of an automobile chassis, of a yoke secured to said auxiliary axle and arranged to be turned from a horizontal load drawing position into a vertical load supporting position, means on the top of said yoke for receiving the bolster of a trailer vehicle, and a bracket arranged to be connected with said yoke and with the reach of a trailer vehicle for drawing said vehicle, said bracket being detached when said yoke is moved into a horizontal position.

Signed at Seattle, Wash., this 15th day of July, 1919.

SAMUEL GLENN.